Aug. 17, 1965  A. AMBLI  3,200,765
DIESEL EXHAUST SYSTEM
Filed April 24, 1963
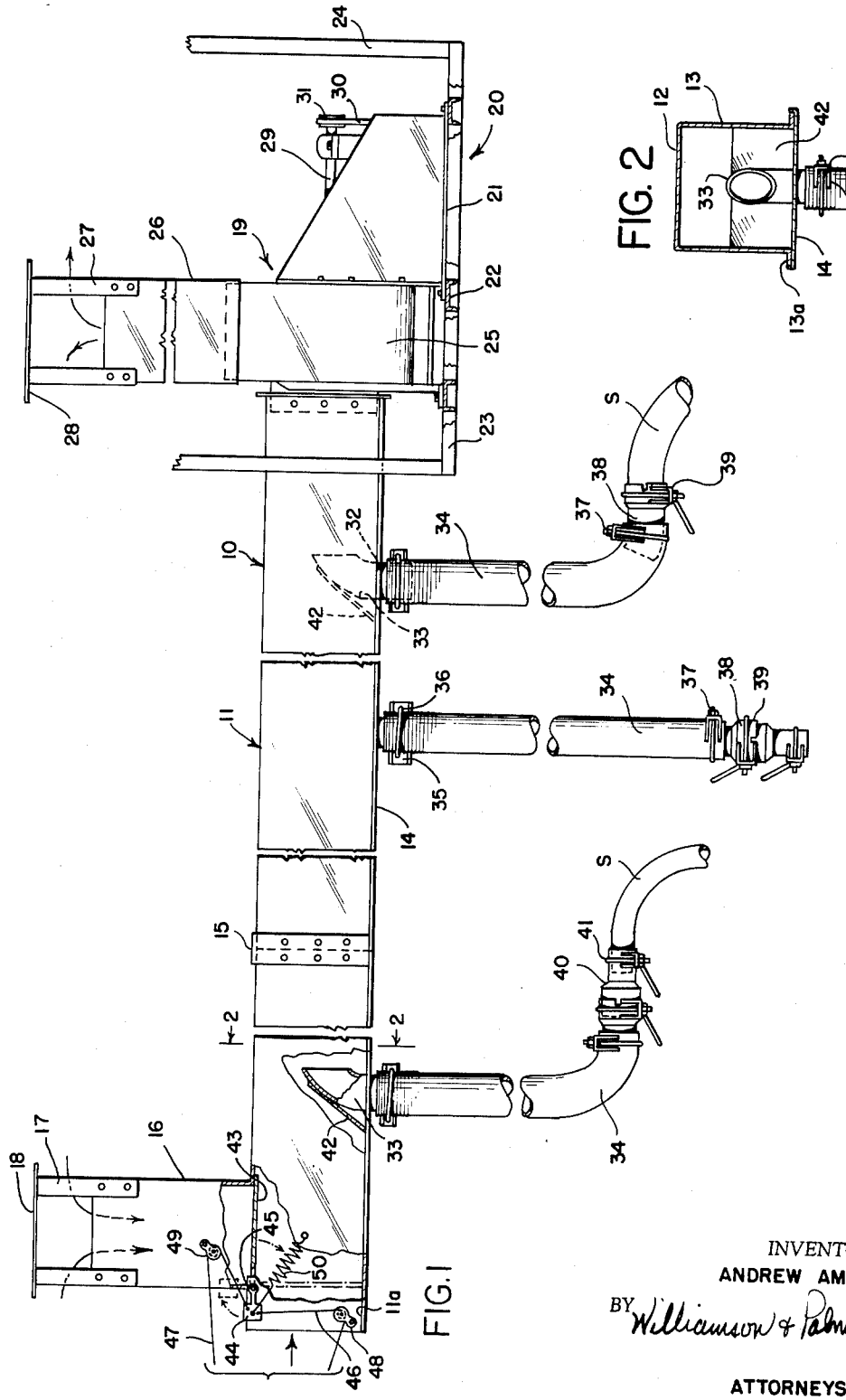
INVENTOR.
ANDREW AMBLI
BY Williamson & Palmatier
ATTORNEYS

United States Patent Office 3,200,765
Patented Aug. 17, 1965.

3,200,765
DIESEL EXHAUST SYSTEM
Andrew Ambli, 2376 N. Hamline Ave., Roseville, Minn.
Filed Apr. 24, 1963, Ser. No. 275,458
7 Claims. (Cl. 104—52)

This invention relates to an exhaust system for vehicle building shelters such as garages, and more particularly to an exhaust system for use in removing exhaust fumes from within a garage or the like.

In building structures wherein vehicles are serviced, such as garages and the like, it is necessary to make provision for the removal of exhaust fumes produced by operation of the vehicles. Some of the internal combustion engines, especially diesel engines, used on larger vehicles are capable of producing large volumes of exhaust fumes during operation thereof. During the servicing of such vehicles, it is necessary to operate the engines and in some instances it is necessary to operate the engines at full capacity. For example, when the governors of the larger diesel engines are being checked, these engines are operated at approximately 2200 r.p.m. for a short period of time and it has been found that when the larger diesel engines are operated at full capacity they are capable of producing exhaust fumes at approximately the rate of 1100 cubic feet per minute. The conventional ventilating in exhaust systems now utilized in garages are incapable of effectively exhausting fumes when a plurality of such engines are simultaneously operated or when an engine is operated at full capacity.

It is therefore a general object of this invention to provide an exhaust system for a building structure in which vehicles are housed and serviced, such as garages and the like, and in which the exhaust system is so arranged and constructed that the exhaust fumes produced by the vehicle engines during operation thereof may be readily evacuated from the building.

Another object of this invention is the provision in a building structure such as a garage, of an exhaust system, of simple and inexpensive construction, including an elongate exhaust conduit positioned within the building structure and provided with a fan type exhaust mechanism, whereby a plurality of vehicles may have their respective exhaust pipes connected to the conduit through the mediary of hose members to thereby permit highly effective evacuation of the exhaust fumes produced by the vehicle engines during operation thereof without contamination of the air in the building by such fumes.

A further object of this invention is the provision in a garage structure of an exhaust system of the class described which is arranged and constructed to permit the intake end of the conduit to be selectively intercommunicated with air exteriorly of the building or air located within the building whereby fumes within the building may be readily and effectively exhausted therefrom.

These and other objects and advantages of my invention will more fully appear from the following description made in connection with the accompanying drawings wherein like character references refer to the same or similar parts throughout the several views, and in which:

FIG. 1 is a diagrammatic side elevational view of the invention foreshortened and with certain parts thereof broken away for clarity; and FIG. 2 is a vertical sectional view taken approximately along line 2—2 of FIG. 1 and looking in the direction of the arrows.

Referring now to the drawing and more specifically to FIG. 1 it will be seen that one embodiment of my exhaust system designated generally by the reference numeral 10 is there shown. My exhaust system 10 includes an elongate main conduit or duct 11 which is mounted within a building structure such as a garage adjacent the ceiling thereof, and which, as best seen in FIG. 2, is of generally rectangular configuration. This conduit 11 includes an upper wall 12, opposed side walls 13 and a bottom wall 14. It will be noted that the side walls 13 have outturned flanges 13a which are secured to the outer marginal edges of the bottom wall 14 by any suitable means such as welding or the like. The conduit 11 may be constructed of sections as shown and each section being joined by suitable U-shaped joint straps or members 15. These joint straps 15 may be secured to the abutting end portions of the connected sections by bolts, rivets or the like.

One end portion of the conduit 11 may be connected to an inlet duct or conduit 16, the latter projecting through the roof of the garage or building structure to intercommunicate the conduit 11 with the exterior. It will be noted that in the embodiment shown, the inlet duct 16 is arranged in right angular relation with respect to the conduit 11. The upper end portion of the inlet 16 has attached thereto by suitable bolts or the like, elongated attachment elements or straps 17, the upper ends of which are fixedly connected to a substantially flat deflector plate 18 for preventing debris and the like from falling into the open end of the inlet duct.

The other end of the conduit 11 is connected in communicating relation with a fan type exhaust mechanism 19. It will be noted that this exhaust mechanism 19 is positioned upon a support structure 20, the latter including a substantially flat plate 21 rigidly secured to transverse support members or channels 22. These transverse channel support members 22 are interconnected at their respective ends by longitudinal support elements 23 which in turn are supported by suitable posts 24, the latter having their respective upper ends secured to and depending from the roof of the structure in which the system 10 is positioned.

The fan type exhaust mechanism 19 includes a fan housing 25 in which is positioned a suitable exhaust fan (not shown). The fan housing 25 as noted in FIG. 1 is connected in communicating relation with the main conduit 11 and is also connected with an upwardly extending exhaust stack or duct 26 which projects through the roof of the building structure or garage. It will be noted that the exhaust duct 26 has a plurality of attachment elements 27 secured to the upper end thereof and that these attachment elements have a deflector plate 28 rigidly affixed to their respective upper ends. The deflector plate 28 serves to cause lateral deflection of the exhaust fumes which are exhausted through the exhaust duct 26.

Although not shown in the drawing, the fan which is positioned within the fan housing 25 will be driven by suitable power means and in the preferred embodiment will be driven by a three quarter horse power electric motor. This electric motor will have the conventional output shaft which is drivingly connected to a driven shaft 29 by means of a drive belt 30. This endless drive belt 30 is trained around a pulley 31 affixed to the driven shaft 29 and is also trained around a pulley (not shown) affixed to the output shaft of the electric motor. It is pointed out that the driven shaft 29 is drivingly connected to the bladed fan positioned within the fan housing 25 whereby when said shaft 29 is revolved the bladed fan within the fan housing will be correspondingly revolved. It will therefore be seen that when the fan type exhaust mechanism is operated, a stream of air will be introduced into the main conduit 11 through the inlet duct 16 and will thereafter be discharged through the exhaust duct 26.

In order to permit highly effective evacuation of exhaust fumes from engines operating within the garage or building, means are provided for interconnecting the exhaust pipes of the engines with the main conduit 11. To this end it will be seen that the bottom wall 14 of the conduit 11 is provided with a plurality of openings 32 therein. Projecting through each of the openings 32 in fixed relation therewith is a rigid pipe or coupling member 33 and it will be noted that the end portion of this coupling member 33 which is disposed within the conduit 11 is curved so that the open end thereof faces towards the discharge end of the conduit 11. The lower end portion of each of the coupling members 33 projects exteriorly of the conduit 11 and is connected to the upper end of a flexible preferably impervious hose member 34 by means of a suitable clamp mechanism. It will be noted that this clamp mechanism includes a clamp member 35 which is suitably apertured for receiving the ends of a U-bolt 36 therethrough, the threaded ends of the U-bolt being suitably engaged by conventional nuts as best seen in FIG. 2.

The lower end of each of hose members 34 is provided with a conventional clamp type coupling mechanism 37 which is connectible through the intermediary of an adaptor 38 to the diesel engine stack or pipe S. It will be noted that the adaptor 38 illustrated on the right side of FIG. 1 is provided with a clamp mechanism 39 of conventional construction for securely clamping the adaptor to the exhaust stack S to intercommunicate the latter with the associated hose member 34.

It will be noted that the hose member 34 located on the left of FIG. 1 and the centrally located hose member are provided with additional adaptor members 40 each having suitable clamping mechanisms 41 for accommodating exhaust stacks of smaller size. In this connection, it is pointed out that the exhaust stacks of diesel engines will vary in size and conventional adaptors may be used to connect the upper discharge ends of these exhaust stacks to one of the flexible hose members 34. Thus it will be seen that when an exhaust stack is connected to one of the hose members 34, the fumes produced by operation of the diesel engine will be discharged into the conduit 11. Therefore when the fan type exhaust mechanism 19 is operated, such fumes will be readily exhausted through the exhaust duct 26.

In order to very effectively exhaust the fumes from a plurality of engines operating simultaneously, even when such engines are operated at their full capacity, the conduit 18 is arranged and constructed to permit the most efficient flow characteristics of the stream passing therethrough whereby the exhaust fumes will be effectively removed. To this end, it will be seen that the conduit is provided with a plurality of conduit constricting plates 42, each of which extends between and is interconnected with the opposed side walls 13 of the conduit 11. It will be noted that these conduit constricting plates 42 are inclined towards the exhaust end of the conduit and each engages one of the coupling members 33 so that the interior of the conduit 11 is constricted at that point which the fumes are introduced into the conduit. It will be noted from FIG. 2 that the constrictor plates 42 serve to reduce the cross sectional area of the conduit to approximately one half so that a venturi effect is produced thereat. Thus the stream of air passing through the constriction formed by the inclined plate 42 increases in velocity at the point where the fumes are introduced into the conduit. By increasing the velocity at those points where the gas fumes are introduced into the conduit 11, the gas fumes will be readily conveyed by the moving stream of air towards the discharge end of the conduit. Thus sufficient velocity is imparted to the moving stream of air by the venturi effect produced by the plates 42 so that the fumes will be very effectively conveyed through the conduit. It has been found that the fumes generated from a plurality of diesel engines operating simultaneously and at full capacity may be very effectively evacuated by my system even though a relatively small horsepower electric motor is used.

It is pointed out that when vehicles are stored in a garage or vehicle building shelter, the hose members will not be connected to the exhaust stacks when the vehicles are started merely for the purpose of leaving the garage. However, when parked vehicles are driven from the garage, even though the vehicles are immediately removed, large quantities of exhaust fumes are generated within the interior of the garage. It is therefore necessary to remove these fumes from the garage and to this end it will be noted that that end portion of conduit 11 to which the inlet duct 16 is connected is open as at 11a and communicates with the interior of the garage structure. Means are provided for alternately closing either the open end 11a of the conduit 11 or the inlet duct 16 with respect to the conduit 11.

Referring again to FIG. 1 it will be seen that a gate or closure member 43 is positioned within the conduit 11 and pivotally mounted thereon for swinging movement between a first position, as illustrated in full line configuration in FIG. 1, wherein the duct 16 is closed with respect to the conduit 11, and a second position, illustrated by dotted line configuration, and wherein the open end 11a of the conduit 11 is closed. A crank arm 44 is affixed to the closure member pivot 45 for movement therewith and this crank arm is positioned exteriorly of the conduit 11. A crank arm 44 is provided with a pair of apertures to permit connection of the respective ends of a pair of elongate flexible elements or pull ropes 46 and 47 thereto. It will be seen that the pull rope 46 is trained around a pulley 48 while the pull rope 47 is trained around a pulley 49, and the free end portions of these pull ropes are positioned for ready access by a user.

A helical spring 50 has one end connected to one of the side walls 13 of the conduit and has its other end connected to the crank arm 44. The crank arm, spring and pulley ropes actually constitute an overcenter actuator for the closure member 43. Thus it will be seen that when the pull rope 46 is pulled, the closure member 43 will move from the position illustrated in full lines towards the dotted line position and will be maintained in the dotted line position because of the overcenter effect produced by the spring 50. Conversely when the pull rope 47 is pulled, the closure member will be moved from the dotted line position illustrated in FIG. 1 to the full line position and will be maintained in closing relation with respect to the air duct 16 by virtue of the overcenter effect produced by spring 50.

In use, my novel exhaust system 10 will be used to maintain the air within the garage structure free of fumes while vehicles parked therein are being serviced. Quite often, during servicing of the vehicles, it is necessary to operate the engine usually at an idling speed. On other occasions, especially during servicing and checking of the engine governors, it is necessary to operate the engine at full capacity, at approximately 2200 r.p.m., as contrasted with the idling speed of approximately 500 to 800 r.p.m. When a diesel engine is operated at approximately 2200 r.p.m. it produces exhaust fumes at the rate of approximately 1100 cubic feet per minute. However, by connecting the stack to one of the hose members 34 through the mediary of an adapter, the gas fumes will be readily exhausted from the building. It is preferred that when the hose members 34 are connected to the exhaust stacks of the vehicle diesel engines, the closure member 43 will be disposed in the dotted line position and in closing relation with respect to the open end 11a of the conduit 11. When so positioned, the air duct 16 will be intercommunicated with the conduit 11 whereby air from the outside will be introduced into and through the conduit.

The exhaust stacks for conventional truck diesel engines vary from 3½ to 4 inches in size and it is preferred that the hose members 34 have an inside diameter of approximately 4 inches. Through the use of conventional adaptors, any conventional exhaust stack may be readily connected to the hose member during the exhausting operation. It has also been found that through the use of my uniquely constructed exhaust system, a relatively small horsepower electric motor (three quarter horsepower) may be used even with relatively large size conduits. In the embodiment shown, the conduit 11 defines a passageway approximately 11 inches high and approximately 12 inches wide. By producing a venturi effect at the points of intake of fumes to be exhausted, the exhaust fumes from several diesel engines may be evacuated simultaneously.

In many vehicle building shelters or garages, the interior becomes contaminated with exhaust fumes when the vehicles are started in preparation of driving the vehicles from the garage. When the engines are started merely for the purpose of removing the vehicles from the garage, it is not desirable to connect the stacks to the hose member 34 but it is desirable to remove the fumes from the interior of the garage. Therefore under these circumstances, the closure member 43 will be disposed in the position illustrated by full lines in FIG. 1 whereby the open end 11a of the conduit 11 is arranged in communicating relation with the interior of the garage. Thereafter when the exhaust mechanism 19 is operated, the gas fumes in the garage will be readily evacuated through the conduit 11 and through the exhaust duct 26.

From the foregoing it will be seen that I have provided a novel exhaust system which is especially adaptable for installation into garage structures to permit highly efficient and rapid evacuation of vehicle exhaust fumes therefrom.

It will also be noted from the preceding paragraphs that my novel exhaust system is uniquely constructed to produce a venturi effect at points of intake of the exhaust fumes thereby permitting the exhaust fumes from a plurality of operating engines to be simultaneously exhausted from the building.

Thus it will be seen that I have provided a novel exhaust system which is not only of simple and inexpensive construction but one which functions in a more efficient manner than heretofore known comparable systems.

It will of course be understood that various changes may be made in the form, details, arrangement and proportions of the various parts without departing from the scope of my invention.

What is claimed is:

1. An exhaust system for exhausting internal combustion engine fumes from within a vehicle building shelter such as a garage or the like, said system comprising
an elongate conduit positioned within a garage and having an open inlet end and having an exhaust end communicating with the exterior,
said conduit having a plurality of longitudinally spaced-apart openings therein,
a plurality of elongate hose members each having one end thereof connected with said conduit in communicating relation with one of said openings and each being connectible at its other end to the exhaust pipe of a vehicle internal combustion engine,
means constricting the interior of said conduit adjacent each of said openings to produce a venturi effect thereat,
and an exhaust fan mechanism connected in fluid communicating relation with said conduit adjacent the exhaust end thereof and being operable to produce a continuous flow of air through said conduit whereby fumes exhausted through the exhaust pipes of the vehicle engines will be discharged through the exhaust end of said conduit.

2. The exhaust system as defined in claim 1 wherein said means constricting the interior of said conduit comprises a plurality of inclined plates each positioned adjacent one of said openings and being inclined towards the exhaust end of said conduit.

3. An exhaust system for exhausting internal combustion engine fumes from within a vehicle building shelter such as a garage or the like, said system comprising
an elongate conduit positioned within a garage and having an exhaust end and an inlet end each communicating with the exterior, said conduit having a plurality of longitudinally spaced-apart openings therein,
a plurality of elongate hose members each having one end connected with said conduit in communicating relation with one of said openings and each being connectible at its other end to a diesel engine exhaust pipe,
means constricting the interior of said conduit adjacent each of said openings to produce a venturi effect thereat,
and an exhaust fan mechanism connected in fluid communication with said conduit adjacent the exhaust end thereof and being operable to produce a continuous flow of air through said conduit whereby exhaust fumes from the vehicle engine will be readily evacuated through said conduit.

4. An exhaust system for exhausting internal combustion fumes from within a vehicle building shelter such as garages or the like, said exhaust system comprising
an elongate conduit positioned within a garage having one end positioned within and communicating with the interior of the garage, and having an exhaust end communicating with the exterior,
an inlet duct connected in communicating relation with said conduit adjacent said one end to interconnect the conduit in communicating relation with the exterior,
a closure member shiftably mounted within said conduit adjacent said one end and being alternately shiftable between first and second positions, said closure member when in said first position being disposed in closing relation with said one end of the conduit, and being disposed in closing relation with said inlet duct when in said second position whereby air may be selectively introduced into said conduit exteriorly and interiorly of the garage,
said conduit having a plurality of longitudinally spaced-apart openings therein,
a plurality of elongate hose members each having one end thereof connected with said conduit in communicating relation with one of said openings and each being connectible at its other end to the exhaust pipe of a vehicle engine,
means constricting the interior of said conduit adjacent each of said openings to produce a venturi effect thereat,
and an exhaust fan mechanism connected in fluid communication with said conduit adjacent the exhaust end thereof and being operable to produce a continuous stream of air through said conduit whereby the exhaust fumes from a vehicle engine will be readily discharged through the exhaust end of the conduit.

5. An exhaust system for exhausting internal combustion engine fumes from within a building such as a garage or the like, said exhaust system comprising
an elongate normally horizontally disposed conduit positioned within a garage having an exhaust end communicating with the exterior,
a plurality of tubular coupling members fixedly connected with said conduit in longitudinally spaced points therealong and each having one end extending into said conduit and having its other end projecting exteriorly thereof,
means connecting said other end of each coupling member to the exhaust pipes of vehicle engines,
means constricting the interior of said conduit adjacent each of said coupling members to produce a venturi effect thereat,
and an exhaust fan mechanism connected in fluid communication with said conduit adjacent the exhaust end thereof and being operable to produce a continuous flow of air through said conduit whereby exhaust fumes from a vehicle engine will be readily exhausted through said conduit.

6. The exhaust system as defined in claim 5 wherein said means constricting the interior of said conduit comprises a plurality of plates each presenting a surface inclined towards the exhaust end of said conduit.

7. An exhaust system for exhausting internal engine combustion fumes from within a vehicle building such as garages or the like, said exhaust system comprising an elongate generally horizontally disposed conduit positioned within a garage or the like and having one end thereof positioned and communicating with the interior of the garage, and having an exhaust end communicating with the exterior, an inlet duct connected in communicating relation with said conduit adjacent said one end to interconnect the conduit in communicating relation with the exterior, a closure member shiftably mounted within said conduit adjacent said one end and being alternately shiftable between first and second positions, said closure member when in said first position being disposed in closing relation with said one end of the conduit, and being disposed in closing relation with said inlet duct when in said second position, a plurality of longitudinally spaced-apart tubular coupling members connected with said conduit, each of said coupling members having one end positioned within and communicating with said conduit and each having its other end projecting exteriorly of said conduit, means for interconnecting each of said coupling members with the exhaust pipe of a vehicle engine, and means constricting the interior of said conduit adjacent each of said coupling members to produce a venturi effect thereat, and an exhaust fan mechanism connected in fluid communicating relation with said conduit adjacent the exhaust end thereof and being operable to produce a continuous flow of air through said conduit whereby exhaust fumes from the vehicle engines will be readily discharged into and through the conduit.

No references cited.

MILTON BUCHLER, *Primary Examiner.*